No. 873,838. PATENTED DEC. 17, 1907.
F. BUCHERER.
POWER TRANSMITTING MECHANISM.
APPLICATION FILED MAR. 19, 1907.
2 SHEETS—SHEET 1.
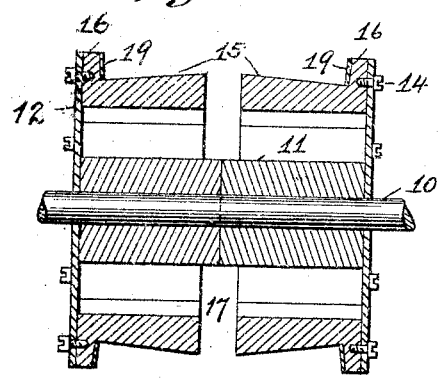
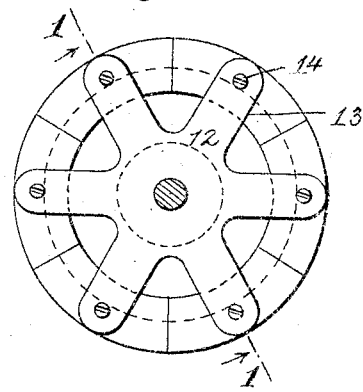
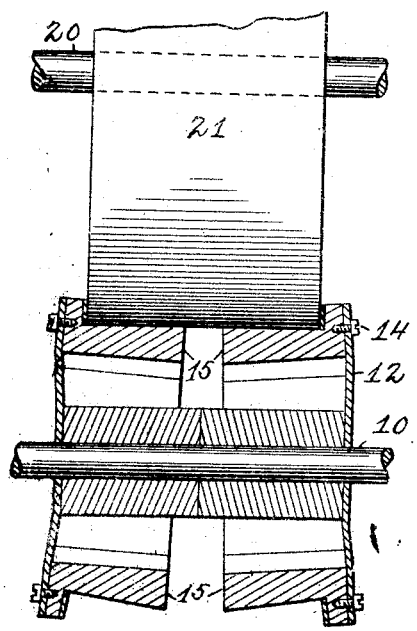
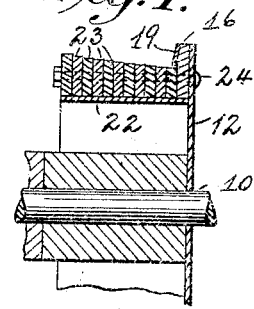
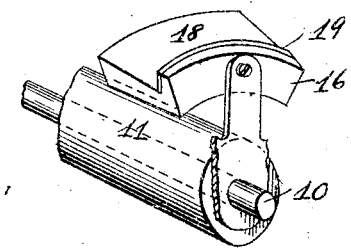

No. 873,838.
PATENTED DEC. 17, 1907.

F. BUCHERER.
POWER TRANSMITTING MECHANISM.
APPLICATION FILED MAR. 19, 1907.

2 SHEETS—SHEET 2.

Attest:
May Hughes
Alan McDonnell.

Frederick Bucherer, Inventor:
by William R. Baird
his Atty.

UNITED STATES PATENT OFFICE.

FREDERICK BUCHERER, OF BAYONNE, NEW JERSEY.

POWER-TRANSMITTING MECHANISM.

No. 873,838.   Specification of Letters Patent.   Patented Dec. 17, 1907.

Application filed March 19, 1907. Serial No. 363,253.

*To all whom it may concern:*

Be it known that I, FREDERICK BUCHERER, a citizen of the United States, residing at Bayonne, in the county of Hudson and State of New Jersey, have invented certain new and useful Improvements in Power-Transmitting Mechanism, of which the following is a specification.

My invention relates to pulleys designed for the transmission of power without the use of a belt, and its novelty consists in the construction and adaptation of the parts as will be more fully hereinafter pointed out.

It has long been desired to manufacture pulleys which could be used in the transmission of power without the usual belt and which could yet be used with the driven pulley without changing the form or size of the latter.

The object of my invention is to supply this need, and I do this by making the driving pulley of such construction that when the driving and driven pulleys are brought together power is transmitted at once and automatically by reason of the fact that lateral annular flanges, with which the driving pulley is provided, are thereby brought to bear upon the driven pulley and transmit motion thereto.

Figure 6:
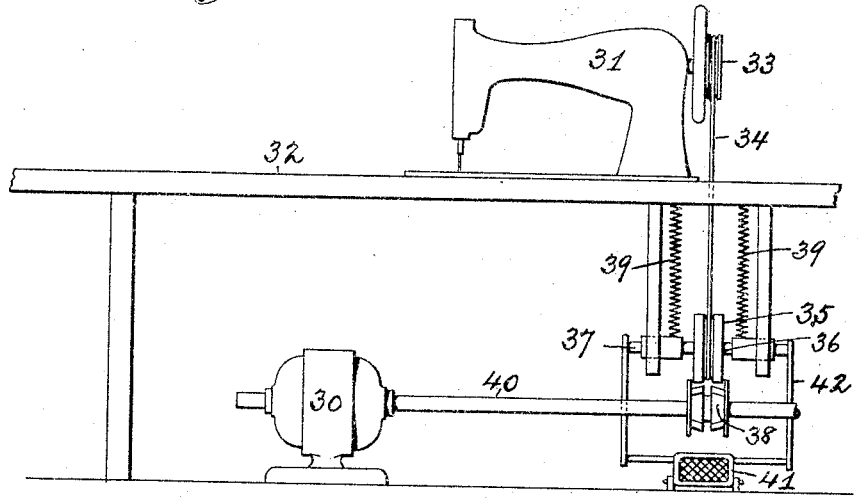
Figure 7:
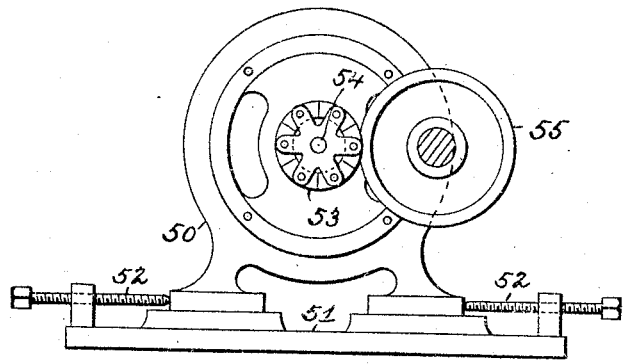

In the drawings Figure 1 is a central section of a pulley embodying my invention, taken on a diametric plane as indicated by the line 1—1 of Fig. 2; Fig. 2 is a side elevation thereof; Fig. 3 is a central section of the driving pulley and an elevation of the driven pulley, showing the position of the parts when the pulleys are in engagement; Fig. 4 is a diametrical section of a modified form of the conical drum; Fig. 5 is a perspective of one of the pulley sectors and its connections; Fig. 6 is an illustration of the application of my improved pulley to a case where it is desired to transmit power through it only temporarily, and Fig. 7 is an illustration of the application of the same to a case where it is desired to transmit power through it permanently.

In Figs. 1 to 5 of the drawings, 10 is a driving shaft. Secured to this in any suitable manner is the driving pulley. 11 is an inner sleeve or shell encircling the shaft and preferably made in two parts. Secured to the shell 11 (or directly to the shaft, if desired) are two carriers 12, each made of light flexible and elastic metal, as thin sheet steel, preferably cut into a star like form, with radial arms 13 and provided with apertures adapted to receive screws 14. Secured in turn to each of these carriers by the screws 14 is a conical drum 15 with its base or larger end turned inwardly and provided at its outer edge with a lateral annular flange 16. The drums are two in number and are of such a size that when assembled there exists between them an appreciable space 17. The drums may be made in sectors 18 as shown clearly in Fig. 5 and the inner edge of the flange 16 is cushioned with a strip 19 of leather or other suitable material, to increase its holding capacity. It is also placed at an angle to afford a larger gripping surface when the pulley is tilted as shown in Fig. 3.

20 is the shaft of the driven pulley 21 of usual form and which needs no special description.

When the driving plluey and the driven pulley are brought together, as shown in Fig. 3, the surface of the driven pulley pressing against the surfaces of the conical drums 15, press them inwardly and thus bring the flanges 16 to contact with the sides of the driven pulley forming a firm engagement between them. This movement is permitted by reason of the elastic and yielding character of the arms 13 of the carrier.

In Fig. 4 is shown a modified form of the conical drum in which 12 is the carrier and 22 is a shell of steel, or other suitable material. 23, 23, are rings preferably made of leather encircling the shell 22 and held in position by a transverse bolt 24.

In Fig. 6 my pulley is shown applied to the actuation of a sewing machine. In this view 30 indicates a motor, 31 is a sewing machine, 32 is the table of the latter, 33 is a pulley secured to its main shaft, and 34 a belt leading to a grooved pulley 35. This latter is mounted on a shaft 36 supported in suitable bearings 37 and normally held out of contact with the driving pulley 38 of my improved construction by means of springs 39. The pulley 38 is secured to the shaft 40 of the motor 30 in a manner heretofore described. To the treadle 41 of the machine is attached a frame 42 secured to or in engagement with the bearings 37 and so arranged that when the treadle is depressed the pulleys 35 and 38 are brought together and power is thereafter transmitted from the motor 30 to the machine 31 so long as the treadle remains depressed.

In Fig. 7 my pulley is shown applied to a motor in such a way as to constitute a permanent power connection. In this view 50 is a motor slidably arranged on a permanent base 51 and capable of adjustment by means of the set screws 52 in a manner well understood in the art. 53 is one of my improved pulleys secured to the shaft 54 of the motor. 55 indicates a driven pulley adapted to engage with the pulley 53. By moving the motor 50 toward the pulley 55 until engagement takes place between the latter and the pulley 53 power is transmitted as before.

What I claim as new is:—

1. A driving pulley provided with a lateral annular flange and a yielding surface whereby pressure of such surface against a second pulley will cause the lateral flange to project inwardly to engage the second pulley.

2. A driving pulley having a periphery of greater diameter near its center than at its edges, a lateral annular flange and a flexible support whereby the surface of the pulley may move inwardly to bring the flange toward the pulley center.

3. The combination with a driving shaft of two conical drums yieldingly mounted thereon, each drum being provided with a lateral annular flange.

4. The combination with a driving shaft of two conical drums yieldingly and independently mounted thereon, in close proximity to each other each drum being provided with a lateral annular flange.

5. A driving pulley comprising two conical drums, each independently and yieldingly mounted on a driving shaft and each provided with a lateral annular flange whereby any pressure against the bases of both drums will cause their flanges to be tilted toward each other.

6. In combination, a driving shaft, an elastic carrier mounted thereon, and a conical drum provided with a lateral annular flange supported on the carrier.

7. In combination, a driving shaft, a pair of elastic carriers mounted thereon, and two conical drums, each provided with a lateral annular flange and each supported on one of the said carriers, so that the bases of the drums are adjacent but do not touch.

8. The combination with a driving shaft of a driving pulley comprising two conical drums, each made of a plurality of segments respectively mounted on elastic supports which in turn are secured to the driving shaft, each segment of the drums having a lateral flange, forming as a whole, when assembled, a complete annulus.

9. The combination with a driving shaft of a driving pulley comprising two conical drums, each made of a plurality of segments respectively mounted on elastic carriers which in turn are secured to the driving shaft, each segment of the drum having a lateral flange, forming as a whole, when assembled, a complete annulus, the two conical drums being arranged with their bases adjacent but separated by a space sufficient to permit the annular flanges to move toward each other when the bases are pressed inwardly.

10. A driving pulley comprising flexible supports, lateral annular flanges carried by said supports and normally held away from the transverse center of the pulley, and means for moving said flanges toward said transverse center adapted to be actuated by pressure upon the periphery of the pulley.

11. A driving pulley comprising flexible supports, lateral annular flanges carried by said supports and normally held away from the transverse center of the pulley, and means for moving said flanges toward said transverse center adapted to be actuated by pressure upon the periphery of the pulley, said means comprising independent drums of greater diameter near the transverse center than near the ends.

12. A pulley comprising an annular flange and means adapted to be actuated by pressure upon the periphery of the pulley to move said flange toward the transverse center of the pulley.

In testimony whereof I affix my signature in presence of two witnesses.

FREDERICK BUCHERER.

Witnesses:
WILLIAM R. BAIRD,
ALAN MCDONNELL.